United States Patent
Dunn et al.

[15] 3,653,222
[45] Apr. 4, 1972

[54] METHOD OF FREEZING SOLUTION DROPLETS AND THE LIKE USING IMMISCIBLE REFRIGERANTS OF DIFFERING DENSITIES

[72] Inventors: Eugene Blair Dunn, South Plainfield; Gerald James Masavage, Manville, both of N.J.; Harold Alfred Sauer, Hatboro, Pa.

[73] Assignee: Bell Telephone Laboratories, Incorporated, Murray Hill, N.J.

[22] Filed: Feb. 27, 1970

[21] Appl. No.: 15,001

[52] U.S. Cl. ..................................................62/74, 264/13
[51] Int. Cl. .........................................F25c 1/00, B29b 3/02
[58] Field of Search ................62/74, 58, 347; 34/5; 264/28, 264/13, 5

[56] References Cited

UNITED STATES PATENTS 3,484,946  12/1969  Sauer..........................................34/5
1,393,383  11/1921  Linebarger..............................264/13

FOREIGN PATENTS OR APPLICATIONS 932,997  7/1963  Great Britain..........................264/13

*Primary Examiner*—William E. Wayner
*Attorney*—R. J. Guenther and Edwin B. Cave

[57] ABSTRACT

This disclosure describes a system for the continuous formation of frozen droplets of an aqueous salt solution. The refrigerant consists of two or more immiscible liquids of substantially different densities. Liquid droplets are injected into the lower, denser medium in a region maintained slightly above the liquid's freezing temperature. Heat is added to the lower medium and extracted from the upper medium at controlled rates. The droplets rise through the negative temperature gradient thus created in the lower medium, and through the turbulent interface between refrigerants. The frozen droplets are extracted from the surface of the upper medium.

12 Claims, 2 Drawing Figures

PATENTED APR 4 1972

INVENTORS
E. B. DUNN
G. J. MASAVAGE
H. A. SAUER

BY Charles E. Graves

ATTORNEY

METHOD OF FREEZING SOLUTION DROPLETS AND THE LIKE USING IMMISCIBLE REFRIGERANTS OF DIFFERING DENSITIES

FIELD OF THE INVENTION

This invention relates to cryogenic systems, and particularly concerns a method for freezing salt solution droplets rapidly, continuously, and in substantially uniform sizes.

BACKGROUND OF THE INVENTION

In the H. A. Sauer, U.S. Pat. No. 3,484,946, there is described a method for freezing droplets in which an aqueous salt solution is introduced into the lowermost region of a denser, immiscible refrigerant. The temperature at the injector nozzle is kept somewhat higher than the solution's freezing point. Slightly above the injector an abrupt temperature decrease is effected to well below the freezing point.

In maintaining the requisite temperature gradient, however, certain problems were encountered. For one, the temperature differentials produced uninhibited convective flow patterns in the refrigerant. These tended to limit the gradient size and occasionally cause the temperature at the injector to dip below the freezing point of the salt solution and freeze shut. For another, the rate of droplet injection had to be limited so as to avoid fluid turbulence that would further disrupt the temperature gradient. Under these conditions droplet freezing is delayed, or extensive droplet coalescing occurs and a poor nonuniform product results. Mechanical baffles and other expedients to help maintain the thermal gradient proved unavailing. The alternative of an inordinately tall freezing column was unattractive in many respects.

Accordingly, the prime object of the invention is to freeze droplets of a liquid dispersion such as a salt solution rapidly in a system requiring their injection into a lower region of a refrigerant body.

Another object of the invention is to maintain a large temperature gradient across a relatively short column of refrigerant through which droplets of an immiscible liquid are rising.

A further object of the invention is to enhance the freezing capacity of a system of the character described.

Still another object of the invention is to control and improve the uniformity of size of frozen agglomerates.

SUMMARY OF THE INVENTION

The invention achieves these and other objects by the use of a refrigerant characterized by at least two liquid refrigerants of significantly different densities. At the injection point the lower, denser refrigerant is maintained at a temperature slightly above the freezing point of the solution. Above the injector, the denser liquid undergoes a sharp temperature drop to well below the solution freezing point. The upper, less dense refrigerant is maintained at a still lower and nearly uniform temperature throughout.

The interface region marks the boundary between the two refrigerants. Advantageously, the density differential is chosen to permit control of the mobility of the interface. Specifically, momentum transfer to the interface as a result of a convective process in the respective refrigerants, initiates and maintains a desired degree of interface turbulence.

The resulting enhanced heat exchange between the two refrigerants renders it relatively easy to establish a temperature near the freezing point of the solution at the injection orifice, and a sharp negative gradient just above it. Further, interfacial turbulence prevents formation of a viscous, hard-to-penetrate liquid layer in the region of the interface.

A prime feature of the invention, accordingly, is a refrigerant consisting of two immiscible liquids of different densities, through which solution droplets rise in consequence of the buoyant forces of the liquids.

A further feature of the invention is the use of a density differential between the two refrigerants that produces turbulence at the interface when a temperature differential between them is established.

DETAILED DESCRIPTION OF AN ILLUSTRATIVE EMBODIMENT

In the specific illustrations shortly to be described, the salt in solution was aluminum sulfate. However, it should be understood that, in accordance with the definition of a salt, any substance which yields ions (other than hydrogen or hydroxyl ions) in water can be processed pursuant to the invention. More generally, solutions in which dissociation of the salt (the solute) into ions takes place may be processed. Solutions in which ionization is absent, or almost absent, also may be processed pursuant to the invention. An example of the latter is household sugar dissolved in water.

It should be understood also that certain fluid colloidal systems, or sols, can be processed as taught herein. Older ceramics, for example, contain silica the salts of which are not soluble in water. Silica colloidal suspensions are available, however, such as that known by the trade name "Ludox" manufactured by E. I. du Pont de Nemours and Company, Inc. In freezing colloidal systems, pursuant to the invention, it is occasionally desirable to first mix the suspension with a binder such as a salt solution or an organic binder such as methyl cellulose.

Broadly, then, the invention embraces the freezing of liquid dispersions, including dispersions on the ionic scale of salt solutions on through fluid colloidal systems.

In a particular embodiment, appropriate materials that are soluble in a solvent for which two mutually immiscible, denser liquid refrigerants exist, and that are also individually immiscible with the solvent, may be processed in accordance with the general inventive teaching.

Figure 1:
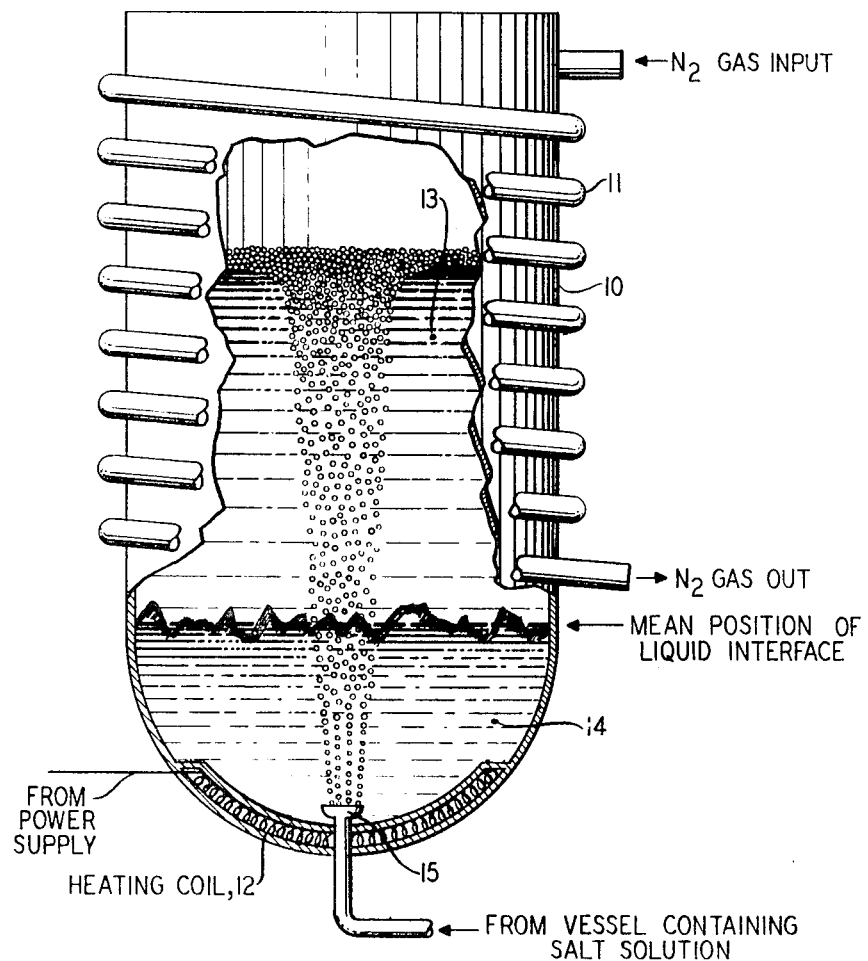
FIG. 1 is a schematic side perspective view of apparatus for practicing the inventive method.

FIG. 1 depicts schematically apparatus suitable for practice of the inventive method. A cylinder 10, which, for example, may be metal or glass, is cooled in its upper portion by a system of coils 11 which transmit a flow of coolant such as nitrogen gas. Surrounding the lower portion is a heat source such as the heating coil 12. Thermocouples 13, 14 are placed at points A and B in the upper and lower portions, respectively. A droplet injector 15 is located at the base interior of the lower portion and is pressure fed with salt solution from a vessel, not shown.

Figure 2:
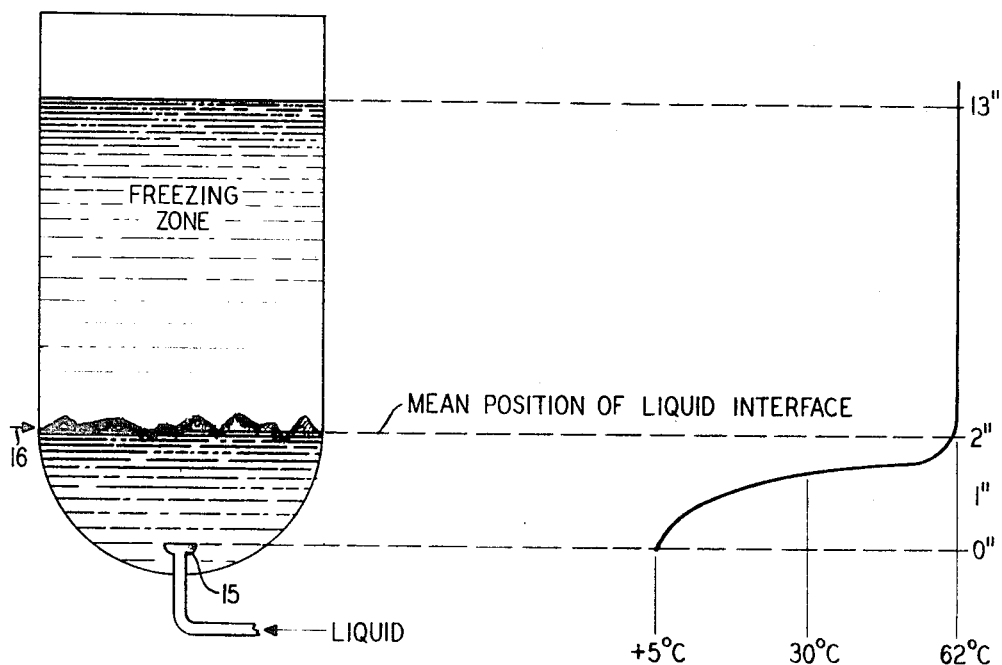
FIG. 2 is a schematic diagram of the refrigerant layers, showing temperature gradients realized.

Pursuant to the invention, the cylinder 10 is charged with two refrigerants of different densities. As seen in FIG. 2, the denser refrigerant occupies the lower or injection zone. The less dense refrigerant occupies the upper or freezing zone.

Numerous combinations of refrigerants possess the requisite characteristics of immiscibility both with each other and with any phase of the salt solution, and greater density than the latter. The following examples are merely illustrative. The apparatus used was as depicted schematically in FIG. 2.

EXAMPLE 1

A two-liquid system consisting of Freon E5 in the injection zone and trichloroethylene in the freezing zone was employed. Heat was applied to the injection zone to bring the temperature adjacent to the injection orifice to about +6° C. By adjusting the nitrogen coolant flow, a temperature of −62° C. was maintained just across the interfacial region 16. About 1.5 inches above the nozzle, the temperature was −35° C. At the interface, 2 inches above the nozzle orifice, it was −45° C. A very sharp negative temperature gradient in the injection zone thus was established, as well as very large temperature differences between the injection orifice region and the region immediately above the interface. The overall temperature gradient realized was generally that depicted in FIG. 2.

Then, a solution of aluminum sulfate was injected using an injection orifice diameter of 0.007 inches, at an injection rate of 7 millileters per minute. The droplets were observed to transmit through the turbulent interface without coalescing; and emerged at the surface of the upper refrigerant fully frozen.

EXAMPLE 2

A two-liquid system consisting of 1, 2 dichloropropane and Freon E1 was charged into the apparatus of Example 1. Adjustment of the heat input and removal as described resulted in maintaining of a sharp temperature profile characteristic of that described in Example 1. Droplet freezing was complete on reaching the upper surface. No coalescing of the droplets took place.

EXAMPLE 3

In the two-liquid system of Example 2 Freon E2 was substituted for Freon E1. Again, a sharp temperature profile characteristic of that described in Example 1 was achieved; and the product results were as in Examples 1 and 2.

The term Freon relates to a product of the E. I. du Pont de Nemours and Company, Inc., the chemical structure for which is

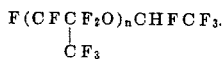

The "E" number in the above Freon designation is equal to $n$. Values of $n$ from 1 to 5 are contemplated within the scope of the invention. The Freons are examples of refrigerants offering the normally desirable properties of nontoxicity and nonflammability.

The following applies to aqueous solutions of aluminum sulfate, and more generally also to many other appropriate salt solutions and solvents.

In general, the details of the profile and the magnitude of the temperature gradient between the two zones are directly related to the difference in densities of the two phases. The greater the density differential, the greater the temperature differential. While temperature differentials of 100° C. or greater between zones can be obtained and controlled, for the invention's immediate purposes, this is neither necessary nor desirable. It was found that large density differentials between the liquid phases, for example, those above approximately 0.5 grams/cm$^3$ tend to produce a relatively stable, viscous and quiescent interfacial region, at which the flow of droplets into the freezing zone is impeded. Moreover, the droplets in tarrying at the interface tend to coalesce or adhere to the viscous layer, carrying the latter with them as they rise. Process control in this case is poor.

However, a lowered density differential effects an increase in momentum transfer to the interface by a convective process occurring in the respective zones, and stimulates interface turbulence. This chaotic motion back and forth of molecules at the interface results in heat transfer from the lower to the upper zone. It is this latter mechanism, that might be termed the thermal valve action of the interface, that permits the close control of temperature gradient in the present invention as well as ready control of temperature at the injection nozzle. Typically, for the region extending from the injection orifice to 2–3 inches above it, a negative temperature gradient of 15–20° C. per inch is adequate and readily maintainable.

Further, droplet passage from the warm zone into the cold zone is substantially unimpeded when the viscous layer is thus avoided and the interface turbulence is achieved. A typical range of density differential suitable for the practice of the present invention is 0.30 to 0.50 grams/cc.

The frozen droplet size decreases with increased injection rate. Injection rate, in turn, is determined by solution supply tank pressure. Over a pressure range of 3 to 45 psi droplet sizes varied from about 2.0 mm to about 0.1 mm. For a constant supply tank pressure of 12 psi, a frozen droplet diameter of 0.3 mm ± 0.05 mm is obtained for about 90 percent of the product. About 10 percent fall on either side of these limits.

In an alternate invention embodiment, a three-liquid refrigerant system is used. The lowermost, densest liquid engulfs the injector in the injection zone; the intermediate zone provides the sharp temperature gradient; and the top zone completes the freezing. Since each interface acts as a thermal valve, the intermediate zone is quite easy to control by adjustment of temperature of the two adjacent refrigerants. An advantage of this system is that the uppermost zone can be reduced in length, resulting in a shorter overall unit with lower heat and heat exchange costs, and lower system thermal losses.

It is understood that the detail in which the invention has been described is for the sole purpose of illustration, and is not intended to be limiting of the invention.

What is claimed is:

1. Method of freezing liquid droplets of salt solution comprising injecting the droplets into the lower region of a body of immiscible refrigerant having a density greater than the solution, characterized in that the refrigerant consists of two immiscible liquids having a substantial density difference, the denser medium in the region of injection maintained at a temperature minimally above the solution freezing point and the less dense medium maintained well below said point said droplets after injection into the denser medium passing through the refrigerant of less density which is maintained below the droplet freezing temperature to freeze the droplets while passing there through.

2. Method of freezing liquid droplets comprising injecting the droplets into a body of refrigerant, characterized in that the refrigerant comprises two mutually immiscible refrigerants of substantially differing densities, each refrigerant also being immiscible with, and more dense than, the liquid droplets, the droplets being injected into the denser refrigerant at a point where the temperature is slightly above the droplet freezing temperature said droplets after injection into the denser medium passing through the refrigerant of less density which is maintained below the droplet freezing temperature to freeze the droplets while passing there through.

3. Method of claim 2 further characterized in that a temperature gradient is maintained in said body, varying from several degrees centigrade above the freezing temperature of the droplets at the injection point to substantially below said freezing temperature at the interface of the two refrigerants.

4. Method of claim 3 further characterized in that the densities of the refrigerants are chosen to promote interface turbulence with the application of a thermal gradient in said body, thus avoiding relatively quiescent, stagnant refrigerant layers at said interface.

5. Method of claim 3, further characterized in that the liquid droplets are a water solution of an ionizable material and one refrigerant is selected from each of groups A and B, where group A consists of trichloroethylene and 1, 2 dichloropropane, and group B consists of fluorocarbons selected from Freon structures having values of $n$ from 1 to 5.

6. Method of claim 3, further characterized in that heat is applied to the denser refrigerant and extracted from the less dense refrigerant for control of said temperature gradient.

7. Method of claim 6, further characterized in that the density differential between said two refrigerants is in a range of from 0.30 to 0.50 grams/cc.

8. Method of claim 5 further characterized in that, for the region extending from the injection point to 2–3 inches above same, a negative temperature gradient in the range of 15°–20° C. per inch in maintained.

9. Method of claim 3, further characterized in that liquid droplets are a water solution of a nonionizable material and the refrigerants are selected, one from each of groups A and B, group A consisting of trichloroethylene and 1, 2 dichloropropane, and group B consisting of fluorocarbons selected from Freon structures having values $n$ from 1 to 5.

10. Method of freezing liquid dispersions comprising injecting the liquid dispersion into the lower region of a body of immiscible refrigerant having a density greater than the liquid dispersion, characterized in that the refrigerant consists of a plurality of immiscible liquids each substantially differing in density, the liquid refrigerant in the region of injection being maintained at a temperature minimally above the freezing point of the liquid dispersion and the less dense refrigerants being maintained well below said point said droplets after injection into the denser medium passing through the refrigerant of less density which is maintained below the droplet freezing temperature to freeze the droplets while passing there through.

11. Method of claim 10, characterized in that the liquid dispersion is a colloidal suspension.

12. Method of claim 10, characterized in that said refrigerant body comprises three liquids with the intermediate said liquid being maintained in a sharp negative temperature gradient by controlled exchange of heat with the adjoining two liquids.

* * * * *